Figure 1:
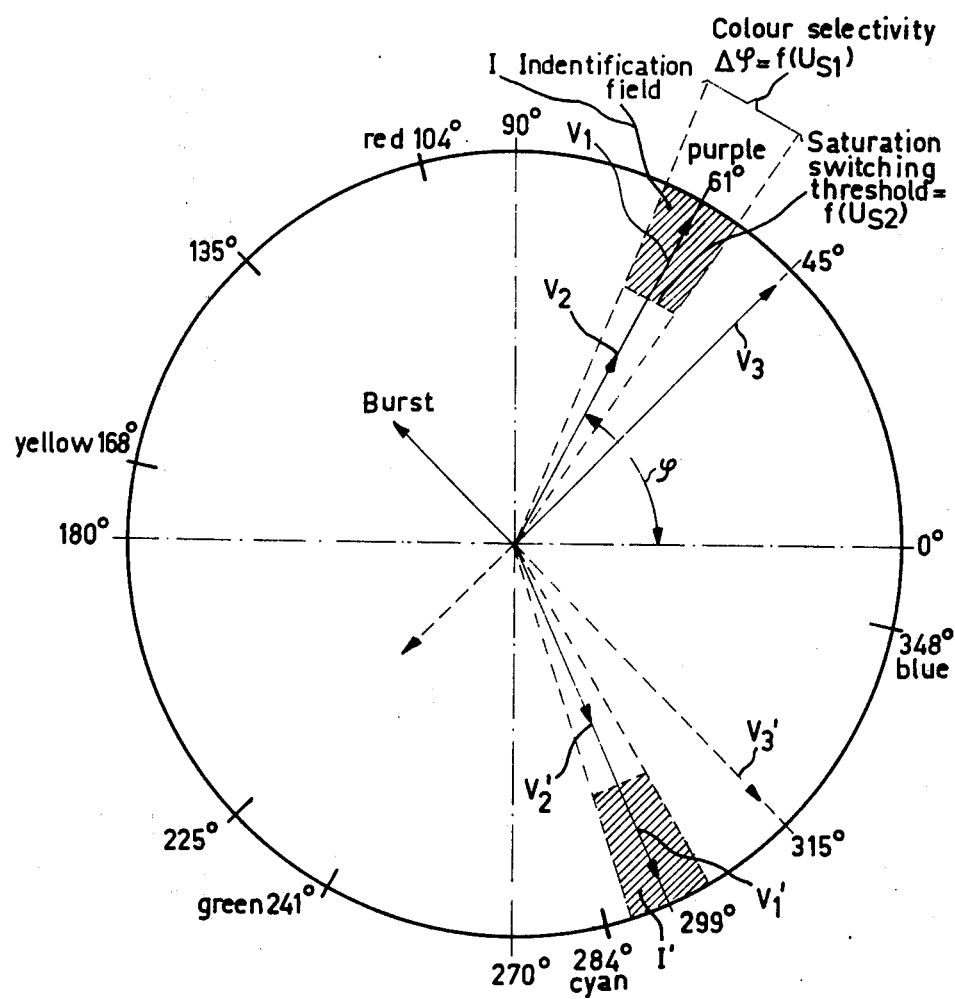

United States Patent [19]

Wellhausen et al.

[11] 4,040,086
[45] Aug. 2, 1977

[54] METHOD OF GENERATING CHROMATICITY POINT-DEPENDENT SWITCHING INFORMATION FROM CODED COLOR VIDEO SIGNALS

[75] Inventors: Hans Wellhausen, Hamburg; Reinhard Friedmann, Pinneberg, both of Germany

[73] Assignee: U.S. Philips Corporation, New York, N.Y.

[21] Appl. No.: 561,416

[22] Filed: Mar. 24, 1975

[30] Foreign Application Priority Data

Mar. 22, 1974 Germany .............................. 2413869

[51] Int. Cl.² ........................................... H04N 5/22
[52] U.S. Cl. ................................................ 358/22
[58] Field of Search .......................................... 358/22

[56] References Cited

U.S. PATENT DOCUMENTS

| | | |
|---|---|---|
| 3,392,231 | 7/1968 | Schonfelder ............................ 358/22 |
| 3,560,638 | 2/1971 | Skrydstrup et al. .................... 358/22 |
| 3,778,542 | 12/1973 | Hanseman .............................. 358/22 |
| Re. 28,021 | 5/1874 | Boxman et al. ........................ 358/22 |

*Primary Examiner*—Robert L. Griffin
*Assistant Examiner*—Aristotelis M. Psitos
*Attorney, Agent, or Firm*—Frank R. Trifari; Henry I. Steckler

[57] ABSTRACT

A chroma-keyer is for a coded color video signal without decoding to color signals taking place. The chrominance signals component is filtered from the coded color video signal and added to a combination of gating stages switching in accordance with an adjusted chromaticity point and a color synchronization signal, which, after adjustable Schmitt triggers and flip flops, provides an output switching signal for chroma-keying.

10 Claims, 3 Drawing Figures

METHOD OF GENERATING CHROMATICITY POINT-DEPENDENT SWITCHING INFORMATION FROM CODED COLOR VIDEO SIGNALS

The invention relates to the generation of chromaticity point-dependent switching information from coded colour video signals (FBAS).

In television studio technique, chromaticity point-dependent switching information, i.e. commutation signals, for the generation of which a given colour in the recorded television picture is used, are used for the partial addition of background pictures. These known addition methods are referred to as "blue screen" technique, if only the colour blue is used for producing the switching signal and as "chroma-key" technique, if the chromaticity point for generating the switching signal can be chosen arbitrarily.

The most conventional use of said methods occurs with the generation of the chromaticity point-dependent switching signal from the three colour signals occurring in television, the red, green and blue signal (in some cases the white signal is used as the fourth singal), which colour signals are present in any colour television camera for recording a television coloured picture. The advantages of this known method are that on the one hand the three colour signals red, green and blue are still present in the full band width, i.e. up to 5 MHz, and hence sharp commutation signal edges can be obtained herewith and that on the other hand only extremely small transit time delays on generating the commutation signal occur.

An important drawback of this known method is that, for generating the commutation signal, only television signal sources may be used from which the three colour signals can also be derived.

However, television signal sources for generating commutation signals which provide only coded signals are also used increasingly. This problem occurs in particular in the so-called multi-plane chroma-key technique in which interim recording on video magnetic tape apparatus is necessary, since said apparatus has only outputs which provide colour video signals coded thereon.

Studio camera devices are also commercially available already which provide only coded signals. In such cases it is usual that a colour signal decoder is provided before the commutation signal generator. This method is termed "FBAS-Chroma-key" which, taking into account the function, is not quite correct since the generation of the commutation signal still takes place from the three signals red, green and blue which in this case are decoded.

The drawbacks of said method are in particular:

1. the multiple signal conversion, as a result of which additionally disturbing effects occur and disturbances already present appear in an amplified manner, 2. in PAL signals and delay line decoders a delay occurs in the vertical direction, which in the multiple chroma-key method can still increase in certain circumstances (this drawback can be avoided in the simple PAL-decoding), 3. due to the decoding and a subsequent commutation signal generation, transit time delays occur between 400 and 1000 nsec which should be corrected again in the colour video signals used for mixing. As a result of this, studio mixing apparatus becomes very expensive when the FBAS-chroma-key method is used and in particular when said method is used in multiple chroma-key.

The invention obviates said drawbacks by a method which is characterized in that the switching information to be derived from the chromaticity point adjusted at a given instant is obtained directly from the coded colour video signal. By suitable switching provisions, the colour vector is always recognized when said vector assumes the adjusted phase position (chromaticity point) and amplitude (colour saturation).

Furthermore, in PAL signals, the phase position of the recognition circuit is also switches from line to line in agreement with the PAL-commutation-phase.

The method according to the invention will be described in greater detail with reference to FIGS. 1 to 3 in which FIG. 1 shows a vector diagram.

Figure 2:
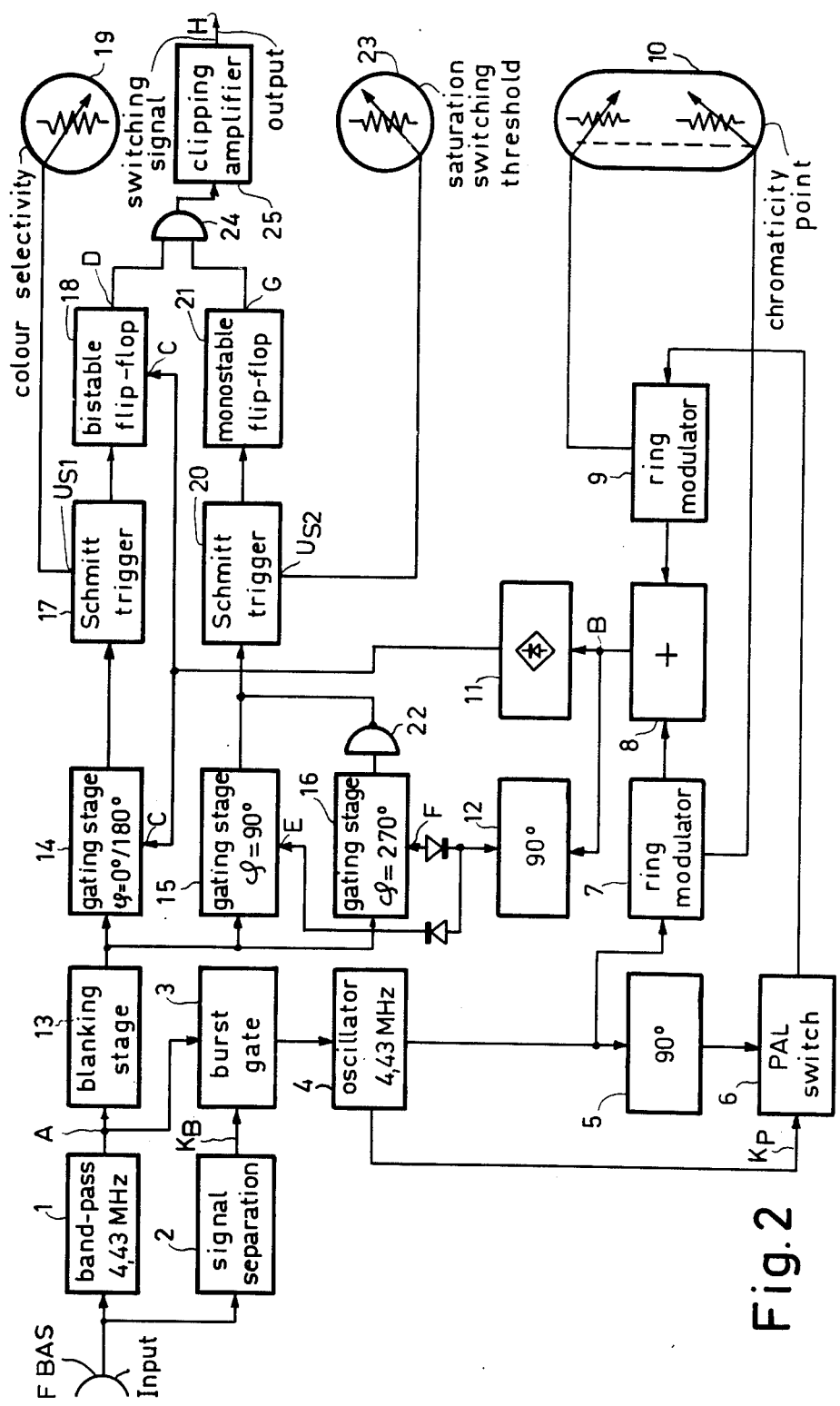
Figure 3:
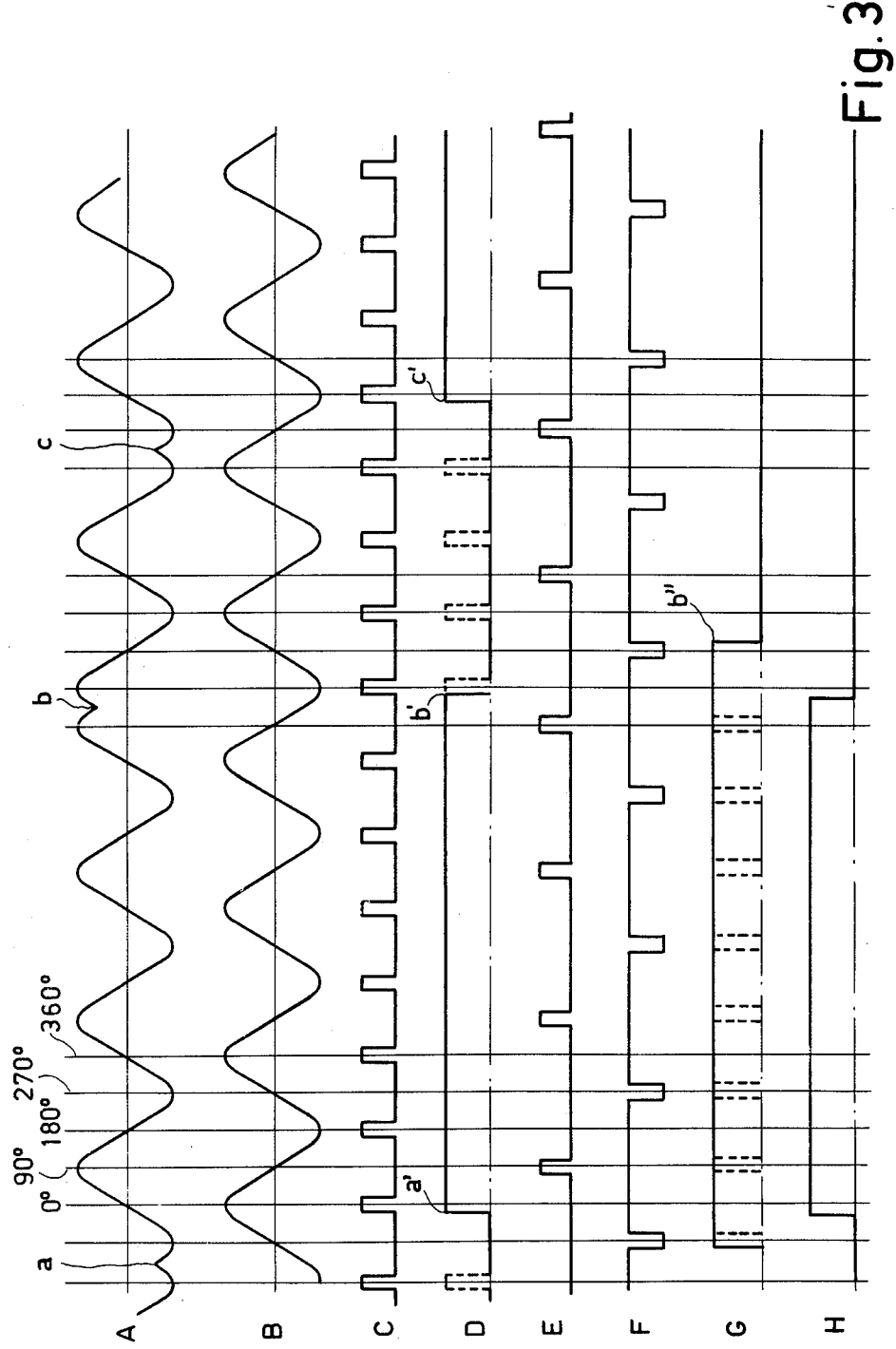

FIG. 2 shows a circuit arrangement suitable for use of the method according to the invention, and FIG. 3 shows a few signals occuring in the device shown in FIG. 2.

FIG. 1 shows the vector diagram of a colour carrier wave in which a certain type of colour is associated with each phase position. By circuitry provisions, according to the invention an identification field I is defined. Always when a vector of a colour carrier wave lands in said identifications field I a switching pulse is given. In PAL signals, the identification field I is also switched from line to line, PAL-synchronously, in the vertically mirrored phase position I'. The phase adjustment $\phi$ of the identification field I can be adjusted in accordance with the desired chromaticity point. In FIG. 1 the phase angle $\phi$ of the identification field I is on an average at $\phi = 61°$, i.e., adjusted in the chromaticity point purple.

The phase sharpness $\Delta \phi$ of the identification field I is established in a switching technical manner and is also adjustable (phase selectivity), since there are cases in which an identification field I which is "wider" for the phase is required from a point of view of operation. The vectors $V_1$ and $V_1'$, respectively, of the colour carrier wave would fall in the indentification fields I and I', respectively, and cause a switching pulse. Although the vectors $V_2$ and $V_2'$, respectively, of the colour carrier wave correspond to the same chromaticity point $\phi = 61°$, said vector is smaller in its amplitude (colour saturation) than a switching threshold $U_{S2}$ of the identification field I and can hence cause no switching pulse. This switching threshold $U_{S2}$ can also be adjusted according to the invention.

The vectors $V_3$ and $V_3'$, respectively, of the colour carrier wave are shifted as regards colour in the direction towards blue ($\phi = 45°$) and, since the vectors are also outside the indentification field, cause no switching pulse either.

For realizing the identification field I, various circuits are feasible. One possibility is to extra superimpose upon the chrominance signal component filtered from the blue video signal (FBAS) (modulated colour carrier wave) a synchronous colour carrier wave constant in phase per line and efficaciously switched in PAL signals and having a previously determined constant amplitude (saturation threshold value). When the phase of the added colour carrier wave has been rotated 180° relative to the desired chromaticity point $\phi$, a total suppression of the colour carrier wave occurs regularly in the presence of a colour carrier wave vector of the desired colour with the adjusted amplitude. This condition may then be evaluated by means of a Schmitt trigger — which then becomes 0 — and a subsequent reversal of the switching signal. At any other instant, also when the colour carrier wave in the original chrominance signal becomes zero in accordance with a black-and-white picture, a colour carrier wave oscillation is present due to the addition of the identification colour carrier wave and the Schmitt trigger shows the condition 1.

The drawback of this circuit resides in the fact that only the saturation value determined by the amplitude of the identification colour carrier wave results in the generation of a switching signal and an increase of the indentification field also reduces the colour selectivity by an increase of the switching threshold of the Schmitt trigger. This means that the identification field as shown in FIG. 1 is simultaneously increased in both directions.

FIGS. 2 and 3 show another possibility of realizing the identification field. The chrominance component A is filtered from the coded colour video signal FBAS by means of a band pass filter 1. The burst key pulse $K_B$ is also obtained in a synchronization signal separation stage 2 and, via a burst gate circuit 3, the burst (color synchronization pulse) with which an oscillator 4 for the reference colour carrier wave is synchronized. An identification colour carrier wave B which can be varied in phase $\phi$ by a chromaticity point selector 10 is obtained from the reference colour carrier wave. This may take place via a modulation circuit which is conventionally used also in colour coding devices and which consists of a 90° phase rotating element 5- PAL signals with the use of the PAL switch 6-, two ring modulators 7 and 9 and an adder stage 8.

Three different commutation pulses C, E and F are obtained from the identification colour carrier wave B the generation of which is only referred to here. The commutation pulse C can be obtained, via a double phase rectifier 11, from the peaks of the half sine waves. The commutation pulses E and F, after a 90° rotation in a phase rotating element 12, are also obtained from the signal peaks, pulse E from the positive and pulse F from the negative, via diodes.

After the burst signal has been removed from the chrominance signal A of the colour video signal FBAS in a blanking stage 13, so as not to generate needless commutation pulses, said signal is supplied to three gating stages 14, 15 and 16.

The gating stage 14 and A Schmitt trigger 17, as well as a bistable flipflop circuit 18 recognize the passages through zero of the chrominance signal oscillation.

As a result of this the pulse train D arises. When the synchronization signal A has the desired phase position or a 180° rotated position, the signal D becomes a 1. Due to the adjustment of the switching threshold $U_{S1}$ in the Schmitt trigger 17, the phase selectivity or colour selectivity can be adjusted by a control 19.

The bistable flipflop circuit 18 has for its object to bridge the "blanks" between the pulses. Said circuit supplies the signal 1 to the output when only the pulse train C is present and 0 when also the Schmitt trigger 17 provides a pulse. The pulses shown in broken lines in the pulse train D are formed at the output of the Schmitt trigger 17.

Since the said stages 14, 17 and 18 identify the desired colour carrier wave oscillation as well as the colour carrier wave oscillation rotated 180° with respect to this, due to the recognition of the passages through zero, a further choice criterion is necessary. This is provided by the gating stages 15 and 16 with a subsequent Schmitt trigger 20 and monostable flipflop circuit 21. The gating stage 15 provides a pulse which is proportional to the positive amplitude value present during the switching time of the switching pulse E and the gating stage 16 with the switching pulse F provides the same but negative pulse which is inverted by a stage 22 before being transmitted to the Schmitt trigger.

The switching threshold $U_{S2}$ of the Schmitt trigger 20 can be adjusted by a control 23 and determines the colour saturation value from which value on the circuit becomes active.

The monostable flipflop circuit 21 has for its object to bridge the blanks between the pulses.

At the output of the flipflop circuit 21 is formed the pulse train G which, via an AND gate 24, together with the pulse train D provides a switching information H at the output of an amplifier 25. Said switching signal is present during the colour carrier wave phase to be identified, - between the points $a$ and $b$ shown of the chrominance signal A — with the delays $a$ to $a'$ and $b$ to $b'$, respectively. Said delay is approximately 90° or 50 nsec.

The circuit would operate also with only one of the gating stages 15 or 16. In that case, only the non-conductivity time of the monostable flipflop circuit 21 should be approximately doubled.

This simplified circuit, however, will result in a delay longer than 50 nsec with a given succession of phases in the chrominance signal A. Within the scope of the technical ability, other circuit arrangements are possible for generating a switching pulse with the use of the method described with reference to FIG. 1. of generating chromaticity point-dependent switching information from coded colour video signals.

The most important advantages of the method are:
1. simple and cheap construction of the circuit,
2. low transit time delay in generating the switching pulses and hence less expensive mixing devices in which switching pulses of the above-mentioned kind are used,
3. the use in PAL and NTSC signals is possible,
4. no extra line-wise delays of the switching signal in PAL systems; not in multiple use either,
5. fewer possibilities of the disturbance by extensive digitization of the circuit.

What is claimed is:
1. A method of generating chromaticity point-dependent switching information from coded color video signals. said method comprising generating a color carrier wave using an oscillator, synchronizing said oscillator using color synchronization signals derived from the coded color video signals, filtering the chrominance signal component present as a modulated color carrier wave from the coded color video signal, phase-adjusting the generated signal to supply a phase-adjustable color carrier wave, applying the filtered signal and the phase adjusted signal to at least one switching stage in a threshold circuit having an adjustable threshold value, and passing and blocking the chrominance signal component by said switching stage whereby the chrome commutation signal is provided at the output of the threshold circuit.

2. A method as claimed in claim 1 wherein the coded color video signals are coded according to the PAL standard, said method further comprising commutating the phase of the phase-adjustable color carrier wave in a correct manner for PAL so that a color vector corresponding to a chromaticity point adjusted at a given instant is recognized in every line of the color video signal.

3. A method as claimed in claim 1, further comprising independently selecting the adjustment for chromaticity point, color selectivity, and color saturation at which the switching information is generated.

4. A method as claimed in claim 1 further comprising adding the phase-adjustable color carrier wave in the threshold circuit to the chrominance signal component and to the adjusted threshold value of the threshold circuit, respectively.

5. A method as claimed in claim 4, further comprising adding a phase-adjustable color carrier wave having adjustable amplitude and a phase position shifter 180° with respect to the desired phase position to the chrominance signal component of the coded color video signal, and deriving the switching information by decreasing the color carrier wave oscillation to zero amplitude.

6. A circuit for generating chromaticity point-dependent switching information from coded color video signals, said circuit comprising a color carrier wave oscillator synchronized by color synchronization signals derived from the coded color video signals, a filter means for filtering the chrominance signal component present as a modulated color carrier wave from the coded color video signal, a phase-adjusting stage means coupled to said oscillator for supplying a phase-adjustable color carrier wave, and a threshold circuit coupled to said filter and to said phase adjusting stage and having an adjustable threshold value, said threshold circuit having at least one switching means for passing and blocking the chrominance signal component supplied to it and an output means for providing the chroma commutation signal.

7. A circuit as claimed in claim 6 wherein the color video signals are coded according to the PAL standard, and said phase adjusting stage comprises means for commutating the phase of the phase-adjustable color carrier wave in a correct manner for PAL so that a color vector corresponding to a chromaticity point adjusted at a given instant is recognized in every line of the color video signal.

8. A circuit as claimed in claim 6, further comprising a plurality of means for adjusting chromaticity point, color selectivity and color saturation at which the switching information is generated, said chromaticity point adjusting means being coupled to the phase adjusting stage, said color selectivity and saturation adjusting means being coupled to said threshold circuit.

9. A circuit as claimed in claim 6, wherein said switching means comprises two switching stages, a first phase rotating element coupled between the phase adjusting stage and one of said switching stages, a pair of series circuits each including a trigger circuit and a flip flop circuit coupled in series with each of the switching stages respectively, and a gate coupled to the outputs of the flip flop circuits and to the output means of the threshold circuit.

10. A circuit as claimed in claim 9, wherein the switching means further comprises a third switching stage, a second phase rotating element coupled between said third switching stage and said phase adjusting stage, said third switching stage being coupled in parallel to said switching stage which is coupled to said first phase rotating element, the two phase rotating elements having a different phase rotation angle.

* * * * *